(12) United States Patent
Carnevali (10) Patent No.: US 7,040,590 B2
(45) Date of Patent: May 9, 2006

(54) UNIVERSAL MOBILE ELECTRONIC DEVICE HOLDER AND CARRYING CASE

(76) Inventor: Jeffrey D. Carnevali, 5957 Beach Dr. SW., Seattle, WA (US) 98136

( * ) Notice: Subject to any disclaimer, the term of this patent is extended or adjusted under 35 U.S.C. 154(b) by 0 days.

(21) Appl. No.: 10/607,938

(22) Filed: Jun. 27, 2003

(65) Prior Publication Data
US 2004/0262481 A1 Dec. 30, 2004

(51) Int. Cl.
*A47K 1/08* (2006.01)
(52) U.S. Cl. ............................... 248/311.2; 248/309.1; 248/903
(58) Field of Classification Search ............ 248/311.2, 248/314, 316.1, 313, 903; D7/620, 625; 297/188.04, 248, 188.06, 188.11, 188.12, 297/188.2; 379/455; 211/32; 224/411, 224/926; 220/903; 206/254
See application file for complete search history.

(56) References Cited
U.S. PATENT DOCUMENTS

| | | | | |
|---|---|---|---|---|
| 4,878,642 A | * | 11/1989 | Kirby, Jr. ................. | 248/311.2 |
| 5,588,055 A | * | 12/1996 | Williamson et al. ........ | 379/446 |
| D377,886 S | * | 2/1997 | Colton ......................... | D7/620 |
| 5,687,874 A | * | 11/1997 | Omori et al. ............... | 220/737 |
| 5,709,429 A | * | 1/1998 | Bergin .................... | 297/188.04 |
| 5,860,559 A | * | 1/1999 | Wang .......................... | 220/737 |
| 6,039,206 A | * | 3/2000 | DeFrancesco ............... | 220/737 |
| 6,644,524 B1 | * | 11/2003 | Garvin ....................... | 224/411 |

\* cited by examiner

*Primary Examiner*—Gwendolyn Baxter
(74) *Attorney, Agent, or Firm*—Charles J. Rupnick (57) ABSTRACT

A single combined holding and carrying apparatus that is both permanently installable as a vehicle holding platform and removably attachable as by a belt to a user's person as a personal carrying apparatus for a cellular telephone or other mobile electronic device. The apparatus is formed of a thin-walled rectangular tube-shaped body molded of a resiliently pliable material, the body being structured with an opening positioned adjacent to one end and a closure adjacent to an opposite end, whereby an interior cavity of the apparatus is formed. The apparatus includes a lip structure formed external to the tube-shaped body and contiguous with the opening; a plurality of pliable fins formed as projections from interior walls of the tube-shaped body; and a pair of spaced-apart fastener apertures formed in one exterior wall of the body.

11 Claims, 7 Drawing Sheets

UNIVERSAL MOBILE ELECTRONIC DEVICE HOLDER AND CARRYING CASE

FIELD OF THE INVENTION

The present invention relates to device holding and carrying apparatuses and methods, and in particular to apparatuses for securely holding and carrying cellular telephones and other mobile electronic devices.

BACKGROUND OF THE INVENTION

Holding and carrying apparatuses and methods are known for providing a secure means for either holding or carrying hand-held or mobile electronic devices, such as cellular telephones, mobile global positioning system (GPS) receivers, Personal Digital Accessories (PDAs) and other mobile devices.

Figure 1:
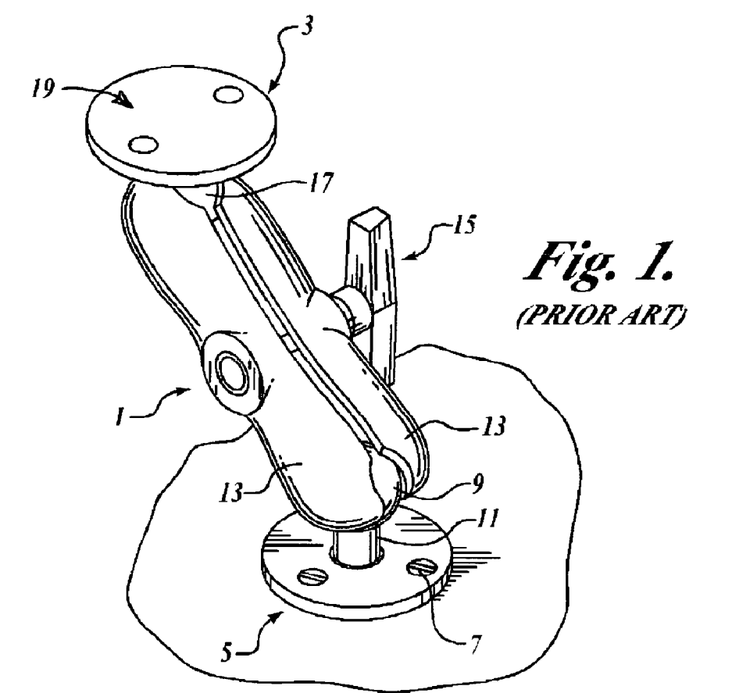
FIG. 1 illustrates one known universal mounting device as described in incorporated U.S. Pat. No. 5,845,885.

However, to date these holding and carrying apparatuses fall generally into either one of two categories: vehicle holding platforms that are permanently or semi-permanently installable in a particular air, land or marine vehicle; and personal carrying platforms that are removably attachable by a belt to the user's person. These device holding and carrying apparatuses are usually configured to operate with a single device, and even with a single brand and model FIG. 1, for example, illustrates one such universal mounting device 1 that provides positionable mounting platform 3. As shown here and described in U.S. Pat. No. 5,845,885, which is incorporated by reference herein in its entirety, universal mounting device 1 is founded on a base 5 that is secured to a fixed surface with a quantity of screws or other fasteners 7. A sphere 9 of resiliently compressible material is presented on a post 11 for access by a pair of clamping arms 13 that together form a socket that is positionally secured relative to the sphere 9 when a clamping mechanism 15 is tightened. The positionable mounting platform 3 is presented on a second sphere 17 of resiliently compressible material that is captured in a second socket formed at the opposite end of the clamping arms 13 and relatively positionally secured by increased tightening of the clamping mechanism 15. The positionable mounting platform 3 is optionally structured with retention structure 19, configured by example and without limitation as a pair of spaced-apart fastener apertures, to support any of the above variety of mobile devices or another device or structure of the user's choice. A product that practices the invention of U.S. Pat. No. 5,845,885 is commercially available from National Products, Incorporated of Seattle, Wash., USA Portable beverage holders dedicated to a single use are also well-known. For example, portable holders are well-known for securely tending beverage apparatus of different sizes, such as liquid filled cans, glasses or bottles, in airplanes, automobiles or All Terrain Vehicles (ATVs), on boats, on bicycles or motorcycles, or other vehicles or conveyances where the beverage apparatus is desired that be snugly maintained against adverse conditions.

Figure 2A:
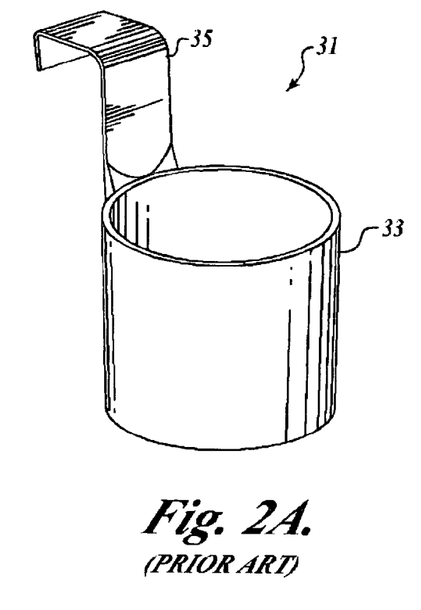
FIG. 2A illustrates a portable beverage holder with an integral clamping mechanism for holding a standard twelve (12) ounce beverage can or bottle.
Figure 2B:
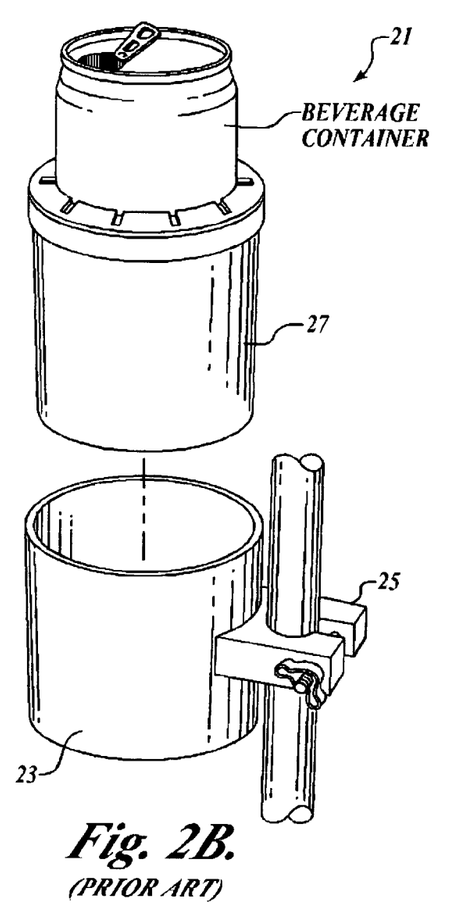

FIGS. 2A and 2B both show examples of such portable beverage holders. Accordingly, FIG. 2A illustrates a portable beverage holder 21 for holding a standard twelve (12) ounce beverage can or bottle. The portable beverage holder 21 has a cup portion 23 with an integral clamping mechanism 25 whereby it is structured for mounting on a vertical rail or stem. Different variations of such portable beverage holders are structured for mounting on horizontal or diagonal rails. The user inserts a beverage apparatus, such as a standard 12 ounce aluminum soda or beer can, in the cup 23 for hands-free operation of the vehicle or another activity. As shown here and described in U.S. Pat. No. 4,596,370, which is incorporated in its entirety by reference herein, the cup portion may be oversized for a standard 12 ounce can to permit a pocket of flexible insulating material 27 between the can and the cup.

FIG. 2B illustrates a more flexible portable beverage holder 31 having a cup portion 33 suspended from a hanger 35 for connecting the portable holder to window frames, chair backs or the like.

Figure 3:
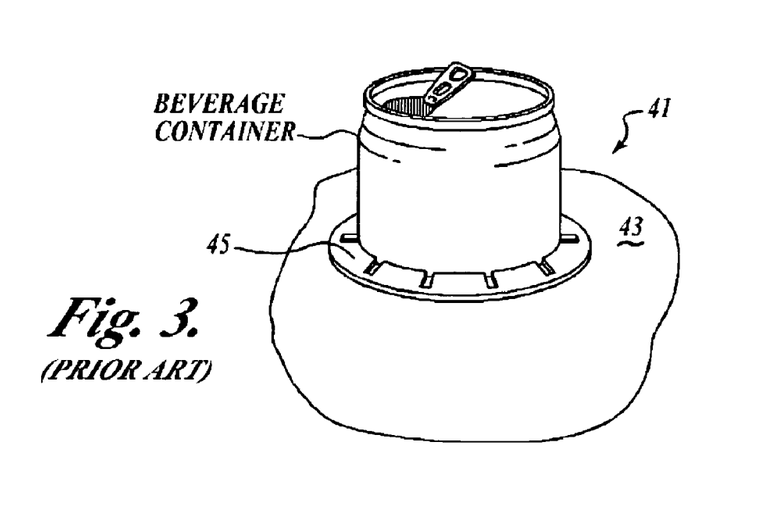
FIG. 3 illustrates one known fixed-position beverage holder.

Other fixed-position beverage holders are also well-known, examples of which include cylindrical recesses sized or oversized to accept a beverage cup, mug, bottle, or beverage can, such as a common 12 ounce glass or plastic bottle or aluminum can. Such fixed-position cylindrical recess beverage holders are often molded into the center consoles, door handles and dashboards of automobiles. FIG. 3 illustrates one known fixed-position beverage holder 41 formed in a convenient surface 43 and configured with a quantity of longitudinally operating flexible ribs or fingers 45 structured to accept a standard 12 ounce can or bottle and hold it securely.

SUMMARY OF THE INVENTION

The present invention is combined holding and carrying apparatus for a mobile electronic or other device, such as a cellular telephone, by providing an apparatus and method for holding and carrying a mobile electronic or other device in a single combined apparatus that is both permanently or semi-permanently installable as a vehicle holding platform and removably attachable as by a belt to the user's person as a personal carrying apparatus.

According to one aspect of the invention, the invention is an apparatus formed of a thin-walled rectangular tube-shaped body that is molded of a substantially smooth-finish, resiliently pliable material, the body being structured with an opening positioned adjacent to one end and being further structured with a closure adjacent to an end opposite from the opening, whereby an interior cavity of the apparatus is formed. The apparatus includes a lip structure that is formed integrally with an external surface the tube-shaped body and contiguous with the opening; a plurality of integrally formed fins projecting from each interior wall of the tube-shaped body; and a pair of spaced-apart fastener apertures integrally formed in one exterior wall of the tube-shaped body.

According to another aspect of the invention, the apparatus also includes a pair of opposing relief slots formed in the opening of tube-shaped body that permit a user to reach and grasp, as by pinching, a mobile electronic or other device inserted within the interior cavity of the apparatus.

According to another aspect of the invention, the apparatus also includes a pair of bosses integrally formed in one exterior wall of the tube-shaped body, the pair of bosses are spaced-apart by a pair of intervening stiffeners integrally formed in a diamond pattern with the bosses.

According to another aspect of the invention, the apparatus also includes one or more stiffeners integrally formed on the exterior wall of the tube-shaped body having the pair of spaced-apart fastener apertures formed therein.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 2A and 2B illustrate examples of portable beverage holders, wherein:

FIG. 2B illustrates a more flexible portable beverage holder suspended from a hanger for connecting to window frames, chair backs or the like;

FIGS. 4, 5 and 6 illustrate one embodiment of the combined holding and carrying apparatus of the invention, wherein:

DETAILED DESCRIPTION OF PREFERRED EMBODIMENT

In the Figures, like numerals indicate like elements.

The present invention is an apparatus and method for holding and carrying a mobile electronic or other device in a single combined apparatus that is both permanently or semi-permanently installable as a vehicle holding platform and removably attachable as by a belt to the user's person as a personal carrying apparatus.

The combined holding and carrying apparatus for a mobile electronic or other device includes a cup-shaped body molded of a resiliently pliable material having a substantially smooth surface finish as a tube-shaped pocket having that is open at a first end and closed at a second opposing end, the tube has interior and exterior wall surfaces that form an interior cavity; one or more resiliently pliable members or ribs project inwardly of the tube from the interior wall surface; one exterior wall surface includes integral attachment means for interchangeably attaching the apparatus to a connector device, such as a belt clip, a ball portion of a ball-and-socket mounting device, or another connector device that is configured to both permanently or semi-permanently install on a vehicle as a holding platform and removably attach as by a belt to the user's person as a personal carrying apparatus. The tube is alternatively formed with a round or elliptical shaped cross-section, or a square or rectangular shaped cross-section having filleted corners at the wall intersections.

Figure 4:
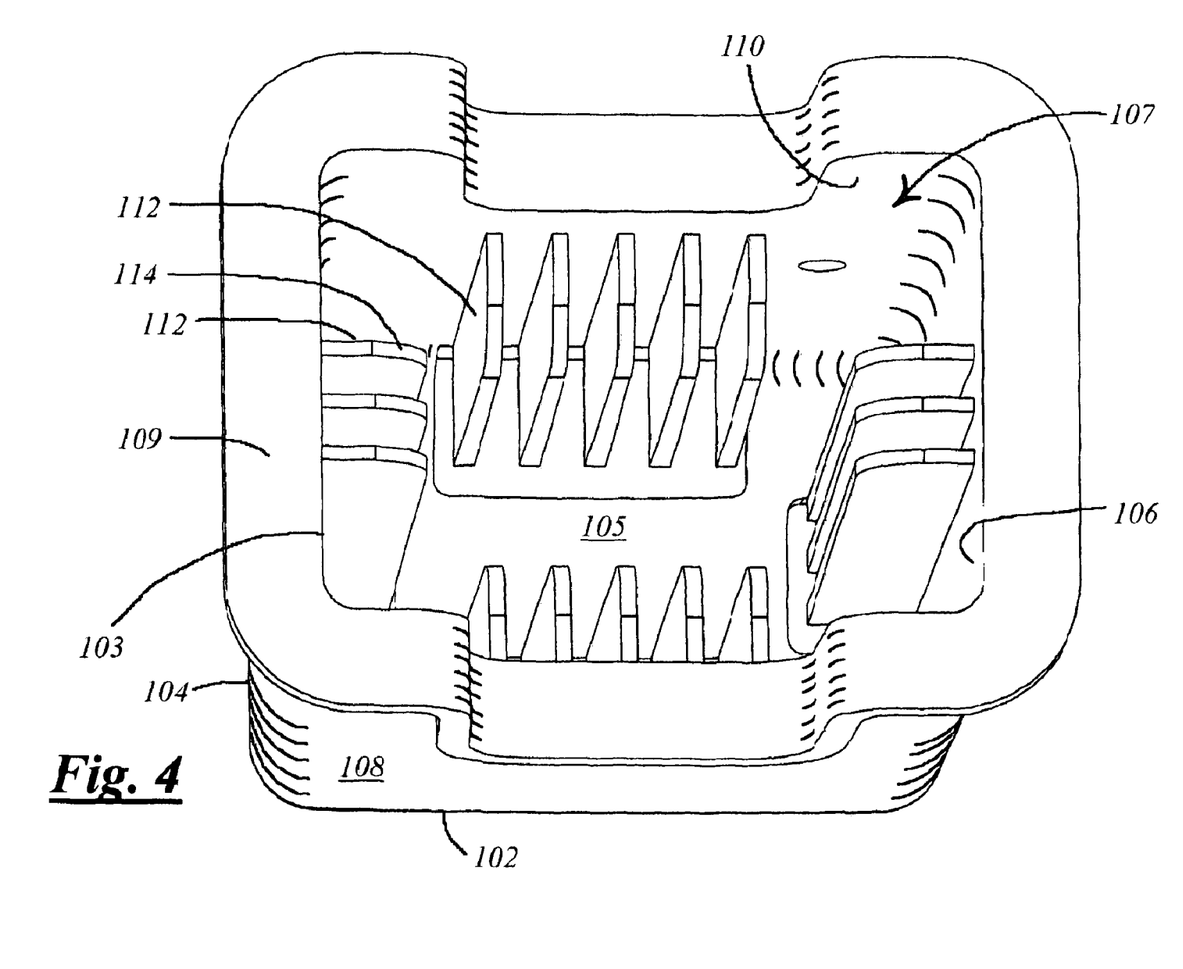
FIG. 4 is a top-down perspective view of the combined holding and carrying apparatus of the invention.
Figure 5:
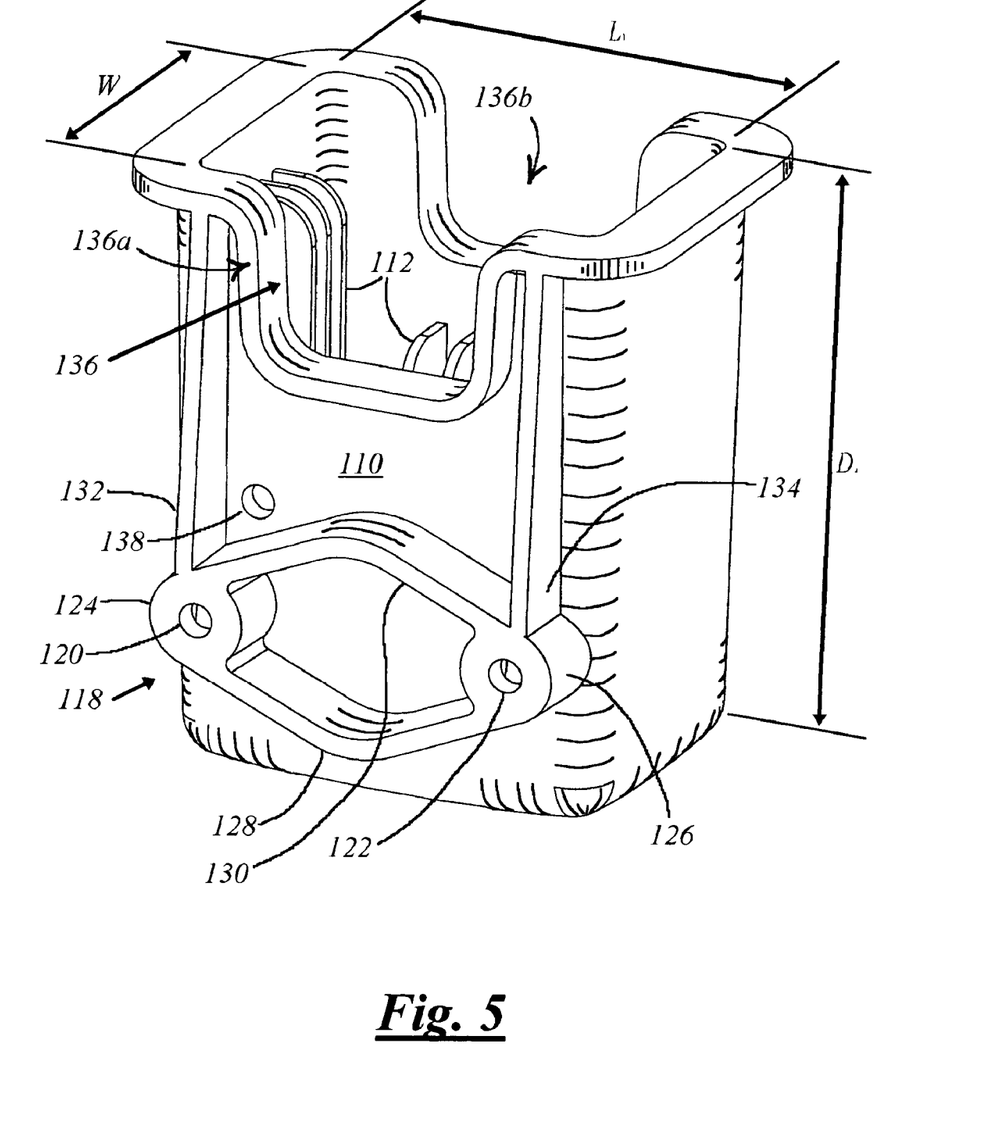
FIG. 5 is a perspective view of the combined holding and carrying apparatus of the invention from the back.
Figure 6:
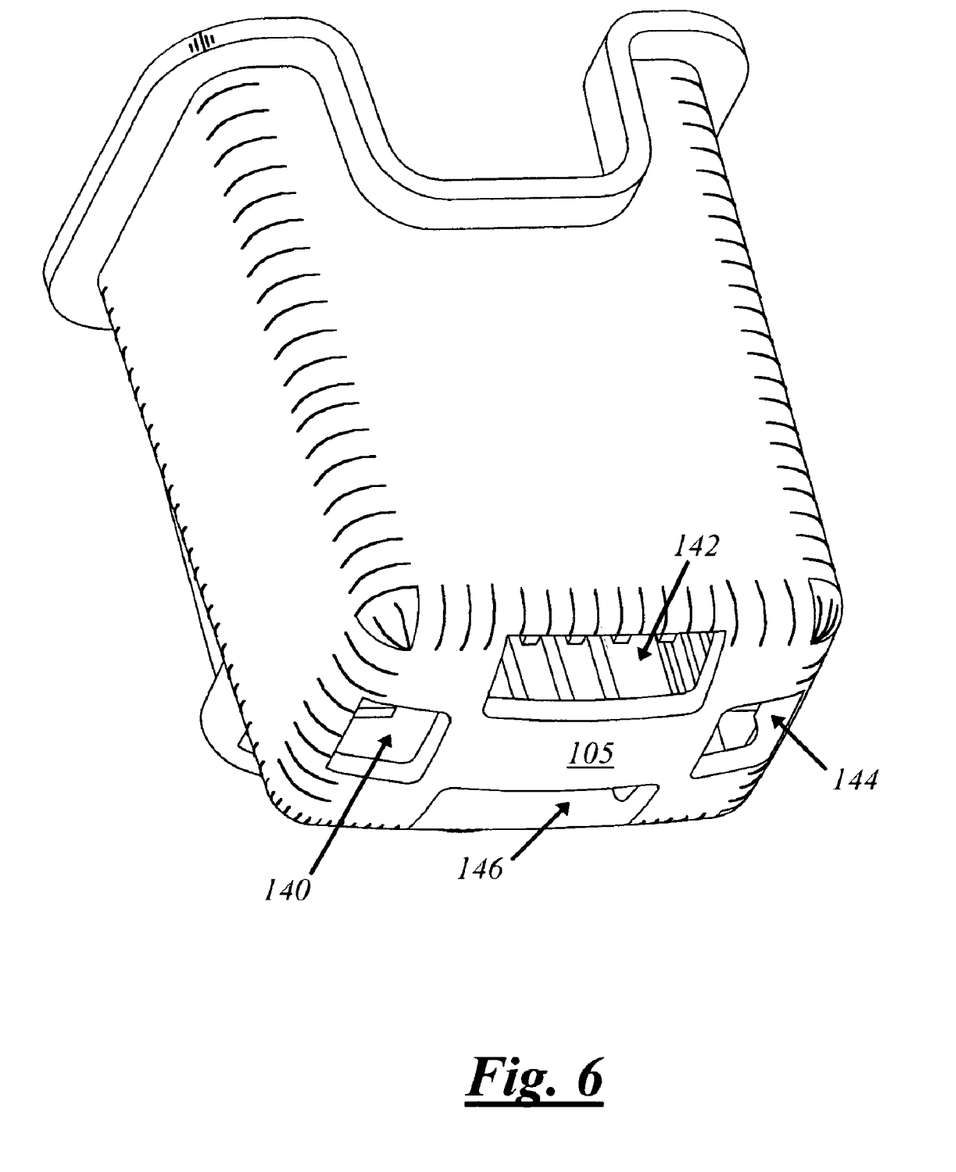
FIG. 6 is a perspective view of the combined holding and carrying apparatus of the invention from the bottom front.

FIGS. 4, 5 and 6 illustrate one embodiment of the combined holding and carrying apparatus of the invention indicated generally at 100. FIG. 4 is a top-down perspective view of the combined holding and carrying apparatus 100. FIG. 5 is a perspective view of the combined holding and carrying apparatus 100 from the back. FIG. 6 is a perspective view of the combined holding and carrying apparatus 100 from the bottom front. According to the embodiment illustrated in FIGS. 4, 5 and 6, the combined holding and carrying apparatus 100 is a substantially rectangular open-topped container having a substantially continuous closed tubular walled body 102 when a mobile electronic or other device is inserted through an opening 103 in one end of the tubular body 102 toward an opposing bottom closure 105 whereby within the closed tubular wall of body 102 a cavity 107 is formed according to one embodiment having the approximate length L, width W and depth D dimensions appropriate for accepting a modern cellular telephone or other mobile electronic device, such as a pager, a portable Global Position System (GPS) receiver, or a hand-held two-way radio. However, the length L, width W and depth D dimensions are optionally increased or decreased independently or in different combinations to accommodate different mobile electronic or other devices. The bottom closure 105 also operates across the cavity 107 to stiffen the tubular shape of body 102 so that wall thickness can be minimized while structural integrity is maintained.

The opening 103 optionally includes an integral enlarged lip structure 109 that stiffens the opening 103 and operates as a lead-in surface for easing blind insertion of a mobile electronic or other device. According to one embodiment of the invention, the integral lip structure 109 is formed external to the opening so that it does not interfere with removal of an mobile electronic or other device inserted into the cavity 107. When the tubular body 102 is of a square or rectangular shape, as illustrated, it is formed of first and second pairs of generally planar spaced-apart walls 104, 106 and 108, 110, the first narrower pair of walls 104, 106 being more widely spaced-apart than the second relatively wider pair of walls 108, 110. By stiffening the opening 103 the enlarged lip structure 109 permits the wall thickness of the upright tubular body 102 to be minimized while maintaining structural integrity.

According to one embodiment of the invention, an interior surface of one or both of the first pair of walls 104, 106 is structured with one or more individual resiliently flexible or pliable members 112, shown in FIGS. 4, 5, 6 as fins or ribs, projected inwardly toward the center of the apparatus and the interior surface of the opposing wall. The ribs 112 project inwardly as much as about 25 percent of the width of the intervening walls 108, 110, or in other words, as much as one quarter of the distance between the opposing interior wall surfaces. The ribs 112 thus fill up to about one half the distance between the walls 104, 106.

According to an alternative embodiment of the invention, the interior surfaces of one or both of the second pair of walls 108, 110 is structured with one or more of the resiliently pliable members 112, i.e. the fins or ribs, projected inwardly toward the center of the apparatus and the opposing interior wall surface. The ribs 112 project inwardly as much as about 25 percent of the width of the intervening walls 104, 106, or as much as about one quarter of the distance between the opposing interior wall surfaces.

According to yet another alternative embodiment of the invention, the ribs 112 as described herein project inwardly substantially perpendicularly from the interior surfaces of all of the walls 104, 106, 108, 110. The ribs 112 are provided as means for interfering with an external shell or wall surface of a mobile electronic or other device when such a device is inserted into the cavity 107 formed between the tubular walls 104–110 through an opening 103 in one end of the apparatus 100. The ribs 112 thereby securely contain the inserted device against inadvertent ejection otherwise resulting from gravity when upturned, shocks, and vibrations. The resiliently pliable members or ribs 112 also serve as shock and vibration dampers for damping or attenuating at the inserted device shocks and vibrations applied to the tubular body 102 of the apparatus 100. Each of the one or more resiliently pliable members or ribs 112 optionally includes a slanting, sloping, curved or chamfered lead-in surface 114 nearest the opening 103 into the interior cavity 107 for easing blind insertion of a mobile electronic or other device.

By inspection it can be seen that the one or more individual resiliently pliable members 112 also operate as elongated longitudinal stiffeners on the interior wall surfaces when configured as inwardly projected fins or ribs, as shown in FIGS. 4, 5, 6. The resiliently pliable members 112 thus also permit the wall thickness of the upright tubular body 102 to be minimized while maintaining structural integrity.

The tubular walls 104–110 of the closed tubular body 102 are arranged upright relative to an integral bottom closure 105 opposite the opening 103, the bottom closure 105 having edges partially contiguous with the walls 104–110 of the relatively upright closed tubular body 102. The bottom 105 of the apparatus 100 operates as a stop for arresting an insertion of a mobile electronic or other device inserted into the opening 103 between the opposing walls 104–110 into the interior cavity 107 of the apparatus 100. The bottom 105 also operates as a safety net for securing an inserted device against ejection otherwise resulting from gravity or other downwardly acting force when the apparatus 100 is oriented in a normally upright operating mode with the opening 103 is facing upward.

FIG. 5 best illustrates that an exterior surface of the closed tubular body 102 is structured with integral attachment or interface structure 118 for interchangeably attaching the apparatus 100 to a connector device, such as a to a belt clip, a ball portion of a ball-and-socket mounting device of the type described herein and disclosed in U.S. Pat. No. 5,845,885, the entirety of which is incorporated by reference herein, or another attachment configured either to permanently or semi-permanently install on a vehicle holding platform and to removably attach to a user's person, as by attachment to a belt looped about the waist.

For example, according to one embodiment of the invention, the interface structure 118 is embodied by example and without limitation as a pair of spaced-apart fastener apertures 120, 122 positioned in the exterior surface of one of the second relatively wider pair of upright wall sections 108, 110, the pair of spaced-apart fastener apertures 120, 122 are structured with for coupling the apparatus 100 to a belt clip, a ball portion of a ball-and-socket mounting device, or another connector. While the interface structure 118 is illustrated as one pair of spaced-apart fastener apertures 120, 122, the interface structure 118 is not so limited. Rather, the interface structure 118 may be embodied as more or less fastener apertures. The fastener apertures 120, 122 are optionally threaded for a threaded fastener or are constructed with a smooth bore as clearance holes for threaded or other fasteners. According to one embodiment of the invention, the interface structure 118 includes a pair of pedestals or bosses 124, 126 integrally formed on the exterior surface of the upright tubular body 102 with the bosses 124, 126 containing the pair of spaced-apart fastener apertures 120, 122, respectively.

The bosses 124, 126 are optionally joined by a first pair of stiffeners 128, 130 of the interface structure 118 that project from the exterior surface of the upright tubular body 102 between the bosses 124, 126 containing the pair of spaced-apart fastener apertures 120, 122. The pair of stiffeners 128, 130 are formed integrally both with the exterior surface of the upright tubular body 102 and with the bosses 124, 126 containing the pair of spaced-apart fastener apertures 120, 122. The pair of stiffeners 128, 130 are optionally structured in an diamond pattern (shown) or other shape desirable for conforming to a mounting surface of a belt clip, a ball portion of a ball-and-socket mounting device, or another connector of choice.

The exterior surface of the upright tubular body 102 containing the bosses 124, 126 or one or more other exterior wall surfaces of the upright tubular body 102 optionally include additional integral stiffeners 132, 134, shown by example and without limitation as elongated bar-shaped stiffeners stretching between the respective bosses 124, 126 and the underside of the lip stiffener structure 109 that stiffens the opening 103 into the interior cavity 107. The additional stiffeners 132, 134 can be seen by inspection to maintain the tubular shape of the apparatus 100 relative to a connector coupled to the interface structure 118, while permitting the wall thickness of the upright tubular body 102 to be minimized without losing structural integrity.

FIG. 5 also best illustrates a relief 136 in the tubular body 102 that permits a user's fingers (not shown) to reach and grasp, as by pinching, a mobile electronic or other device inserted within the interior cavity 107 of the apparatus 100. In FIG. 5 the relief 136 is embodied by example and without limitation as a pair of wide slots or recesses 136a, 136b formed in opposing walls 108, 110 and extending the opening 103 deep into the interior cavity 107 of the upright tubular body 102. As embodied in FIGS. 4, 5, 6, the lip structure 109 around the opening 103 follows the shape of the relief slots 136a, 136b into the interior of the walls 108, 110 and thereby maintains the stiffness of the opening 103 and the cross-sectional shape of the tubular body 102 without requiring an increase in wall thickness.

FIG. 5 also best illustrates an aperture 138 structured as part of one wall (shown by example and without limitation as the back wall 110) as a means for attaching a lanyard for retaining an optional cover that is structured to fit over the opening 103 for repelling moisture and further for aiding in retention of the inserted mobile electronic or other device within the cavity 107.

FIG. 6 best illustrates one or more optional passages 140, 142, 144, 146 formed through the bottom closure 105 for air cooling of the cavity 107. Alternatively, the one or more passages 140, 142, 144, 146 also act as drains that permit passage of liquids, such as rain or splashed water, through the apparatus 100 without holding moisture in the cavity 107. The passages 140–146 may also enhance producibility when the apparatus 100 is manufactured by injection molding using a resilient plastic material.

Figure 7:
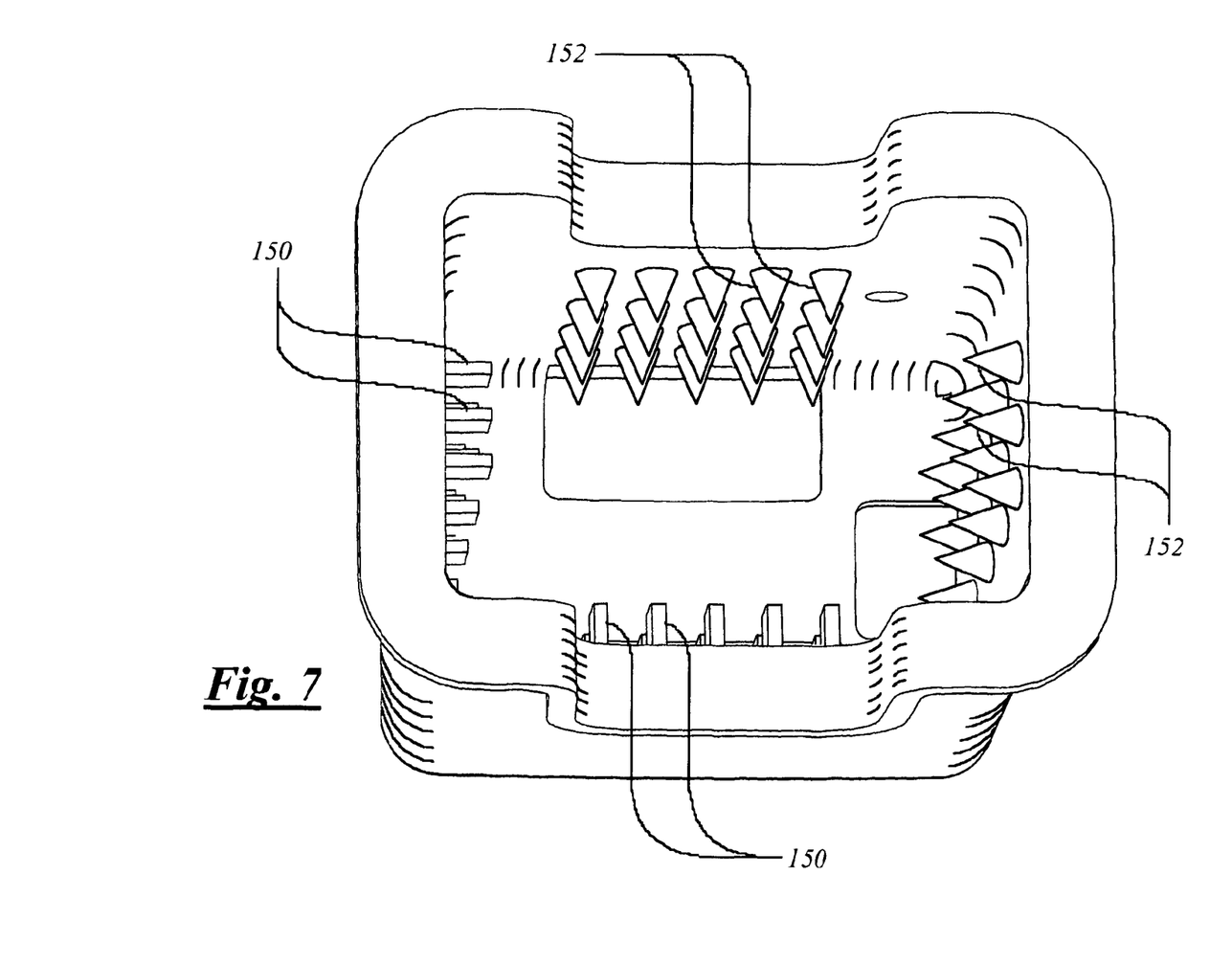
FIG. 7 illustrates by example the one or more flexible or pliable members of the invention embodied both as a quantity of cilia and a quantity of conical knobs.

FIG. 7 illustrates by example and without limitation the one or more flexible or pliable members 112 embodied as a quantity of rods or cilia 150 projected inwardly of the two walls 104, 108 toward the center of the apparatus 100 and the interior surface of the respective opposing walls 106, 110. The cilia 150 are formed, by example and without limitation, by injection molding of the resiliently flexible or pliable plastic, a rubber, or another resiliently flexible or pliable material used in forming the cup-shaped tubular pocket body 102. The cilia 140 are structured to resiliently flex during insertion of different mobile electronic or other devices into the internal bore or cavity 107 of the combined holding and carrying apparatus 100 and to subsequently press inwardly of the walled body 102 to interfere with an external wall surface of the inserted mobile electronic or other device. The flexible or pliable members 112 embodied as a quantity of cilia 150 thereby effectively secure the inserted mobile electronic or other device within the walled body 102 against loads applied externally to the apparatus 100. Upon removal of the inserted mobile electronic or other device, the cilia 150 resiliently straighten and are again oriented inwardly for insertion of the same or another mobile electronic or other device.

FIG. 7 also illustrates by example and without limitation the one or more flexible or pliable members 112 embodied as a quantity of conical knobs 152 projected inwardly of the two walls 106, 110 toward the center of the apparatus 100 and the interior surface of the respective opposing walls 104, 108. The conical knobs 152 are formed, by example and without limitation, by injection molding of the resiliently flexible or pliable plastic, a rubber, or another resiliently flexible or pliable material used in forming the cup-shaped tubular pocket body 102. The conical knobs 152 are structured to resiliently flex or resiliently radially compress during insertion of different mobile electronic or other devices into the internal bore or cavity 107 of the combined holding and carrying apparatus 100 and to subsequently press inwardly of the walled body 102 to interfere with an external wall surface of the inserted mobile electronic or other device. The flexible or pliable members 112 embodied as a quantity of conical knobs 152 thereby effectively secure the inserted mobile electronic or other device within the walled body 102 against loads applied externally to the apparatus 100. Upon removal of the inserted mobile electronic or other device, the conical knobs 152 resiliently expand or straighten to their pre-insertion size and shape and are again oriented inwardly for insertion of the same or another mobile electronic or other device.

Figure 8:
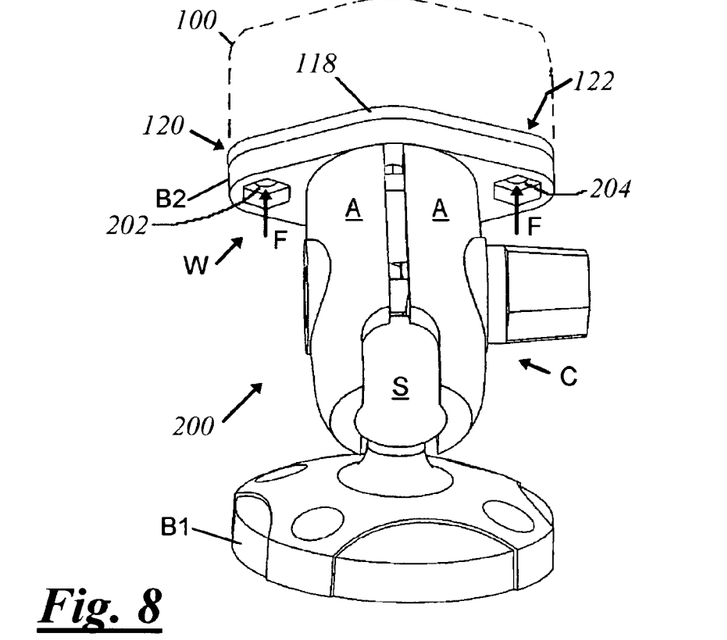
FIG. 8 illustrates the combined holding and carrying apparatus of the invention as embodied in FIGS. 4, 5, 6 and 7 being installed on an exemplary universally positionable mounting device of a type known in the prior art.

FIG. 8 illustrates by example and without limitation one universally positionable connector device 200 that is configured for permanently or semi-permanently supporting the combined holding and carrying apparatus 100 of the invention on a vehicle or other surface. The connector device 200 illustrated in FIG. 8 is disclosed by example in U.S. patent application Ser. No. 10/402,064, entitled, "MAGNETIC MOUNTING PLATFORM" which was filed on Mar. 27, 2003, in the name of the inventor of the present invention and which is incorporated in its entirety herein by reference. U.S. patent application Ser. No. 10/402,064 describes FIG. 8 illustrates the combined holding and carrying apparatus 100 of the invention, as embodied in FIGS. 4, 5, 6 and optionally in FIG. 7, being installed on a connector device 200 embodied as an exemplary universally positionable mounting device of a type known in the prior art. Such universally positionable mounting devices typically include a base "B1" structured for mounting on any surface such as an automobile or airplane dashboard or in the cockpit of a marine vessel. One such universal mounting device includes by example and without limitation a resiliently compressible spherical ball "S" and a and mating split-arm socket assembly "A—A" with a clamping element "C" for securing the ball and socket structure in a desired arrangement. A positively positionable wheel-and-axle structure "W" is rotatable relative to the split-arm assembly A—A. The wheel-and-axle structure W is mounted on a second base "B2" that is structured in a similar diamond shape with the interface structure 118 and having retention structure configured to mate with the fastener apertures 120, 122 of the combined holding and carrying apparatus 100 (indicated generally in phantom). The base B2 thereby abuts when fasteners "F" (indicated as arrows) are installed between the base B2 and each of the fastener apertures 120, 122 in the interface structure 118 to secure the interface structure 118. For example, the retention structure of the base B2 is structured as a pair of spaced-apart fastener apertures 202, 204 positioned to mate with the pair of spaced-apart fastener apertures 120, 122 positioned in the exterior surface of the walled body 102. The pair of fasteners F, such as screws and nuts, are connected between the spaced-apart fastener apertures 120, 122 in the walled body 102 and the pair of spaced-apart fastener apertures 202, 204 in the universally positionable connector device 200 whereby the bosses 124, 126 containing the pair of spaced-apart fastener apertures 120, 122, respectively, are secured against the retention structure of the base B2.

Mounting of the combined holding and carrying apparatus 100 of the invention to the base B2 of the universal mounting device 200 thus provides a universally positionable magnetic mounting platform having the tube-shaped pocket 100 for holding and carrying one or another mobile electronic or other device. An example of such a universally positionable mounting device 200 is described in allowed U.S. patent application Ser. No. 09/855,162 entitled, POSITIVELY-POSITIONABLE MOUNTING APPARATUS, filed May 14, 2001, in the of the inventor of the present invention, which is incorporated herein by reference and practiced in a product that is commercially available from National Products, Incorporated of Seattle, Wash., USA.

The universal mounting device 1 of the prior art (shown in FIG. 1) is operable as a connector device embodied as another exemplary universally positionable mounting device of a type known in the prior art. The combined holding and carrying apparatus 100 of the invention is optionally mounted by securing the interface structure 118 to the retention structure 19 of the positionable mounting platform 3 using fasteners (not shown). The universal mounting device 1 thus provides a universally positionable mounting platform having the tube-shaped pocket 100 for holding and carrying one or another mobile electronic or other device.

Figure 9:
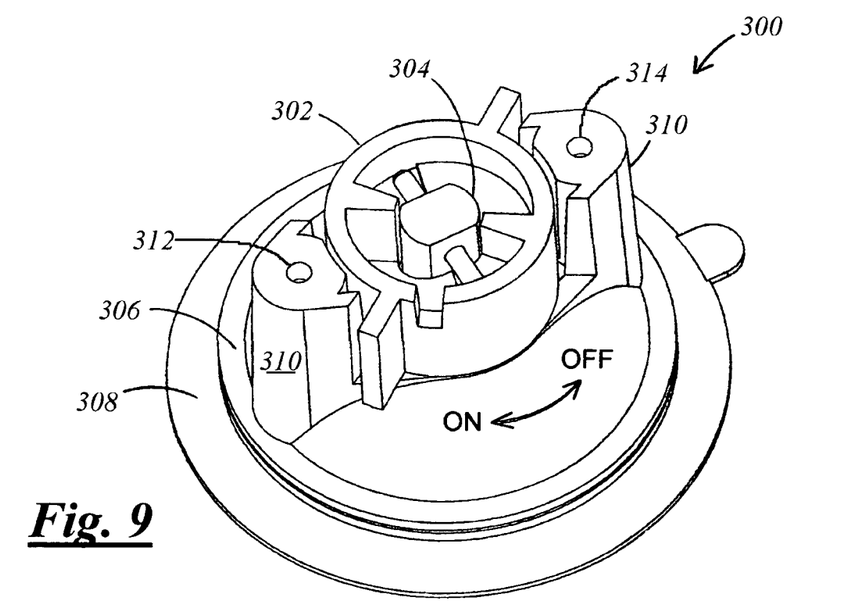
FIG. 9 illustrates by example one suction cup connector device that is configured for removably supporting on a vehicle or other surface the combined holding and carrying apparatus of the invention as embodied in FIGS. 4, 5, 6 and 7.

FIG. 9 illustrates by example and without limitation one suction cup connector device 300 that is configured for removably supporting the combined holding and carrying apparatus 100 of the invention on a vehicle or other surface. The suction cup connector device 300 illustrated in FIG. 9 is disclosed in U.S. patent application Ser. No. 10/374,437, entitled, "SUCTION CUP HAVING COMPACT AXIAL INSTALLATION AND RELEASE MECHANISM" which was filed on Feb. 25, 2003, in the of the inventor of the present invention, which is incorporated herein by reference and practiced in a product that is commercially available from National Products, Incorporated of Seattle, Wash., U.S.A. U.S. patent application Ser. No. 10/374,437 describes a compact axially-driven suction cup installation mechanism including a substantially rigid rotational drive mechanism 302 operating a columnar drive shaft 304 through a bell-shaped housing 306, the columnar drive shaft 304 being coupled to operate a resilient suction cup 308. The rotational drive mechanism 302 is situated for convenience between a pair of diametrically opposed longitudinal stanchions 310 projecting from the external housing surface. The stanchions 310 are structured for mating with the integral interface structure 118 of the apparatus 100. For example, the stanchions 310 are structured with a pair of spaced-apart fastener apertures 312, 314 positioned to mate with the pair of spaced-apart fastener apertures 120, 122 positioned in the exterior surface of the walled body 102. A pair of fasteners, such as screws and nuts (not shown), are connected between the spaced-apart fastener apertures 120, 122 in the walled body 102 and the pair of spaced-apart fastener apertures 312, 314 in the suction cup connector device 300 whereby the bosses 124, 126 containing the pair of spaced-apart fastener apertures 120, 122, respectively, are secured against the stanchions 310. The suction cup connector device 300 thus provides a mounting platform removably securable to a variety of surfaces and having the tube-shaped pocket 100 for holding and carrying one or another mobile electronic or other device.

While the preferred embodiment of the invention has been illustrated and described, it will be appreciated that various changes can be made therein without departing from the spirit and scope of the invention.

What is claimed is:

1. A combined holding and carrying apparatus for a mobile electronic or other device, the apparatus comprising:
   a cup-shaped body open at a first end and closed at a second opposing end, the cup-shaped body having a plurality of resiliently pliable members formed integrally with the cup-shaped body as a thin sheet of resiliently pliable material that is projected inwardly of the cup-shaped body from an interior wall surface, and one exterior wall surface being provided with an integral attachment structure;
   an integral lip structure formed contiguous with the cup-shaped body at the first open end; and
   a pair of bosses integrally formed in one exterior wall of the cup-shaped body, the pair of bosses being spaced-apart by one or more intervening stiffeners integrally formed in a diamond pattern with the bosses.

2. The apparatus of claim 1 wherein the thin sheet of resiliently pliable material project substantially perpendicularly from the interior wall surface of the cup-shaped body.

3. The apparatus of claim 1 wherein the cup-shaped body further comprises a substantially rectangular tube-shaped body that is open at a first end and closed at a second opposing end.

4. The apparatus of claim 1, further comprising a pair of opposing recesses formed in the cup-shaped body and contiguous lip structure.

5. A combined holding and carrying apparatus for a mobile electronic or other device, the apparatus comprising:
   a thin-walled rectangular tube-shaped body molded of a resiliently pliable material, the body being structured with an opening positioned adjacent to a first end and being further structured with a closure positioned adjacent to a second end opposite from the opening;
   an integral lip structure being formed contiguous with the opening and external to the tube-shaped body;
   a plurality of fins being integrally formed as projections from each interior wall of the tube-shaped body;
   a pair of spaced-apart fastener apertures integrally formed in one exterior wall of the tube-shaped body;
   a pair of opposing relief slots formed in the opening of tube-shaped body; and
   a pair of bosses integrally formed in one exterior wall of the tube-shaped body, the pair of bosses being spaced-apart by one or more intervening stiffeners integrally formed in a diamond pattern with the bosses.

6. A combined holding and carrying apparatus for a mobile electronic or other device, the apparatus comprising:
   a cup-shaped body open at a first end and closed at a second opposing end, the cup-shaped body having a plurality of resiliently pliable members projected inwardly of the cup-shaped body from an interior wall surface and formed integrally therewith,
   a pair of bosses integrally formed in one exterior wall of the cup-shaped body, the pair of bosses being spaced-apart by one or more intervening stiffeners integrally formed in a diamond pattern with the bosses;
   an integral lip structure formed contiguous with the cup-shaped body at the first open end; and
   a pair of opposing recesses formed in the cup-shaped body and contiguous lip structure.

7. The apparatus of claim 6 wherein each of the resiliently pliable members further comprises a thin sheet of resiliently pliable material.

8. The apparatus of claim 7 wherein the thin sheets of resiliently pliable material project substantially perpendicularly from the interior wall surface of the cup-shaped body.

9. The apparatus of claim 6 wherein the cup-shaped body further comprises a substantially rectangular tube-shaped body.

10. The apparatus of claim 6 wherein the plurality of resiliently pliable members further comprise a plurality of cilia.

11. The apparatus of claim 6 wherein the plurality of resiliently pliable members further comprise a plurality of conical knobs.

* * * * *